United States Patent [19]

Kobayashi et al.

[11] 4,444,014
[45] Apr. 24, 1984

[54] CONTROL ARRANGEMENT FOR AN HYDRAULIC ASSIST TURBOCHARGER

[75] Inventors: Robert J. Kobayashi, Rancho Palos Verdes; Joe L. Byrne, Torrance, both of Calif.

[73] Assignee: The Garrett Corporation, Los Angeles, Calif.

[21] Appl. No.: 340,342

[22] Filed: Jan. 18, 1982

[51] Int. Cl.³ .................................................. F02B 37/10
[52] U.S. Cl. ...................................... 60/608; 60/429; 417/286
[58] Field of Search ................. 60/607, 608, 429, 430, 60/468; 415/38, 39, 40, 44, 45, 155; 417/286, 304, 308

[56] References Cited

U.S. PATENT DOCUMENTS

| | | |
|---|---|---|
| 2,173,595 | 9/1939 | Schutte . |
| 2,386,096 | 10/1945 | Ehrling . |
| 2,578,028 | 12/1951 | Udale . |
| 2,585,029 | 2/1952 | Nettel . |
| 2,585,968 | 2/1952 | Schneider . |
| 2,898,731 | 8/1959 | Barr . |
| 2,968,914 | 1/1961 | Birmann . |
| 3,005,306 | 10/1961 | Bush . |
| 3,099,385 | 7/1963 | Elford . |
| 3,355,877 | 12/1967 | Chaffiotte . |
| 3,389,554 | 6/1968 | Wolf . |
| 3,473,322 | 10/1969 | Wolf . |
| 3,498,052 | 3/1970 | Silvern . |
| 3,601,506 | 8/1971 | Griswold .............................. 417/286 |
| 3,836,563 | 5/1962 | Garrea . |
| 3,869,866 | 3/1975 | Timoney . |
| 3,921,403 | 11/1975 | McInerney et al. . |
| 3,927,530 | 12/1975 | Braun . |
| 4,002,027 | 1/1977 | Eley ................................. 417/286 X |
| 4,073,140 | 2/1978 | Lang et al. ........................ 417/286 X |
| 4,083,188 | 4/1978 | Kumm . |
| 4,204,405 | 5/1980 | Basham ............................... 60/430 X |
| 4,285,200 | 8/1981 | Byrne et al. . |

FOREIGN PATENT DOCUMENTS 488396 7/1937 United Kingdom .

*Primary Examiner*—Michael Koczo
*Attorney, Agent, or Firm*—Stuart O. Lowry; Albert J. Miller

[57] ABSTRACT

A control arrangement is provided for controlling the operation of an hydraulic assist turbocharger of the type including an hydraulic turbine driven by an hydraulic fluid under pressure to supplementally drive a turbocharger during engine operating conditions when supplemental air flow is required. The control arrangement includes a dual function control valve responsive to engine speed and load to regulate the supply of hydraulic fluid to the hydraulic turbine in accordance with engine air flow requirements.

41 Claims, 5 Drawing Figures

CONTROL ARRANGEMENT FOR AN HYDRAULIC ASSIST TURBOCHARGER

BACKGROUND OF THE INVENTION

This invention relates generally to turbocharger systems for use with combustion engines. More specifically, this invention relates to a control arrangement particularly for use in controlling the operation of an hydraulic assist turbocharger such as that described in commonly assigned U.S. Pat. No. 4,285,200.

Turbochargers and turbocharger systems in general are known for use in supplying a combustion engine with a charge of air under pressure, commonly referred to as charge air. The turbocharger typically comprises a turbine wheel and a compressor wheel mounted for rotation with a common shaft. The turbine wheel and the compressor wheel are positioned within turbine and compressor housings, respectively, which are in turn secured to a so-called center housing including appropriate shaft bearings for supporting the rotating shaft. Exhaust gases from a combustion engine are coupled for passage through the turbine housing to rotatably drive the turbine wheel, whereby the rotating turbine wheel correspondingly drives the compressor wheel to compress ambient air for supply as charge air to the air intake of the engine.

Turbocharged engines are highly advantageous when compared with conventional naturally-aspirated engines in that substantially denser air is delivered to the combustion chamber or cylinders of the engine. This increased air density results in an increased mass flow of available air for combustion to enable the engine to operate at substantially higher performance levels and with greater efficiency. However, an inherent limitation with turbochargers has been their inability to provide the engine with sufficient charge air during some conditions of engine operation. For example, charge air supplied to the engine by the turbocharger during low speed operating conditions typically is insufficient to permit engine operation at a relatively high load and/or to permit relatively rapid engine acceleration. Moreover, in a two cycle engine, charge air supplied by the turbocharger during starting and/or during other low speed operating conditions normally is insufficient to keep the engine from stalling.

A variety of system concepts are known in the art for boosting or supplementing the normal charge air output of a turbocharger during selected engine operating conditions. For example, auxiliary combustion systems have been proposed wherein the energy level of the engine exhaust gases is supplemented during selected engine operating conditions. Compound turbocharger systems have also been proposed wherein multiple turbine and/or compressor components are coupled together to provide supplemental charge air. Additional system concepts include, for example, mechanical drive trains for mechanically supplementing turbocharger rotation and hydraulic drive systems for hydraulically supplementing turbocharger rotation.

One system concept of particular note is described in detail in U.S. Pat. No. 4,285,200 and comprises a specific hydraulic drive arrangement in the form of a so-called three wheel turbocharger. In this system, a nonventilated hydraulic turbine is carried on a turbocharger shaft between the turbine and compressor wheels, and this nonventilated hydraulic turbine is supplied with hydraulic fluid under pressure to supplementally drive the turbocharger. In this manner, the mass flow output of charge air for supply to the engine is significantly increased during selected operating conditions. However, successful operation of this type of hydraulic drive system is predicated upon the provision of an efficient control arrangement for rapidly supplying the hydraulic turbine with a regulated flow of pressurized hydraulic fluid wherein the fluid flow rate is scheduled in accordance with engine air flow requirements to provide the requisite supplemental driving of the turbocharger. Moreover, it is highly desirable for the control arrangement to unload hydraulic pumping elements when supplemental driving is not required or the need for supplemental driving is reduced such that parasitic hydraulic power losses are minimized.

The present invention provides a control arrangement particularly designed to provide a regulated flow of pressurized hydraulic fluid to the hydraulic turbine of an hydraulic assist turbocharger, wherein the fluid flow rate is controlled in response to engine speed and load and wherein the control arrangement substantially unloads hydraulic pumping elements from the engine when the need for supplemental turbocharger driving is reduced.

SUMMARY OF THE INVENTION

In accordance with the invention, a control arrangement is provided for controlling the flow of pressurized hydraulic fluid to an hydraulic assist turbocharger to supplementally drive the turbocharger for supplying charge air to a combustion engine. The hydraulic assist turbocharger includes a turbine wheel and a compressor wheel mounted on a common shaft and respectively received within turbine and compressor housings. Exhaust gases from the combustion engine drive the turbine wheel which correspondingly drives the compressor wheel to supply relatively high density charge air to the engine. An hydraulic turbine is coupled to the turbocharger shaft, and this hydraulic turbine is selectively supplied with pressurized hydraulic fluid, such as oil, to supplementally drive the turbocharger during selected engine operating conditions and thereby provide supplemental charge air to the engine. The control arrangement of this invention includes hydraulic pumping elements for supplying the pressurized hydraulic fluid to the hydraulic turbine, together with a dual function control valve responsive simultaneously to engine speed and engine load to control the flow rate of the pressurized hydraulic fluid to the hydraulic turbine and thereby control the relative degree of supplemental turbocharger driving in accordance with engine air flow requirements.

In accordance with one form of the invention, the hydraulic assist turbocharger comprises a so-called three wheel turbocharger having a nonventilated hydraulic turbine mounted on the turbocharger shaft between the turbine and compressor wheels. When supplemental driving of the turbocharger is required, such as during low speed full load engine operating conditions or during low speed acceleration engine operating conditions, the hydraulic fluid is supplied under pressure to the nonventilated hydraulic turbine to rotatably drive the hydraulic turbine and thereby supplementally drive the turbocharger.

In a preferred form, the control arrangement comprises a pair of positive displacement gear pumps driven by the engine to supply parallel outputs of pressurized hydraulic fluid having a flow rate directly proportional to engine speed. These parallel fluid outputs are combined for supply as a single, pressurized fluid flow for driving the nonventilated hydraulic turbine. The control valve responds to increases in engine speed and engine load to progressively disconnect or unload the fluid output of one gear pump and then to progressively unload the fluid output of the other gear pump as engine speed and/or load increases and the requirement for supplemental turbocharger driving is reduced. The fluid outputs, when disconnected from the hydraulic turbine, are coupled to a relatively low pressure sump such that one or both of the gear pumps are substantially unloaded to minimize parasitic hydraulic power losses.

The control valve comprises a pressure regulating spool valve having a pair of spool lands movable together within a valve body to unload a portion of the gear pump fluid output to maintain the pressure of the hydraulic fluid supplied to the hydraulic turbine relatively constant throughout a range of engine speeds. An engine speed increases resulting in a corresponding increase in the flow rates of the gear pump fluid outputs, the spool lands move within the valve body to progressively disconnect and unload the fluid output of one gear pump and then to at least partially unload the fluid output of the other gear pump. The unloaded fluid outputs are coupled to a relatively low pressure sump to minimize power requirements for continued driving of the gear pumps.

The spool valve is further responsive to the pressure of the charge air supplied to the engine, wherein the charge air pressure is indicative of engine load. The charge air acts against a flexible diaphragm which movably positions an actuator rod into engagement with the spool valve to move the spool lands toward a position further unloading the gear pump fluid outputs as engine load increases. When a predetermined relatively high engine load is reached, the spool lands are moved to a position substantially completely unloading the fluid outputs of both of the gear pumps. When this occurs, a portion of one fluid output is coupled to an hydraulically actuated shut-off valve at the upstream side of the hydraulic turbine to positively stop flow of hydraulic fluid to the hydraulic turbine.

In a modified form of the invention, a transient responsive override valve is provided for selectively supplying a portion of one fluid output to an override chamber within the spool valve for urging the spool lands toward a position of reduced unloading of the fluid outputs for the duration of a transient condition, such as heavy acceleration. When this occurs, the reduced fluid output unloading increases the pressure of the fluid supplied to the hydraulic turbine to correspondingly increase the supplemental driving of the turbocharger during the transient condition.

Other features and advantages of the present invention will become more apparent from the following description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
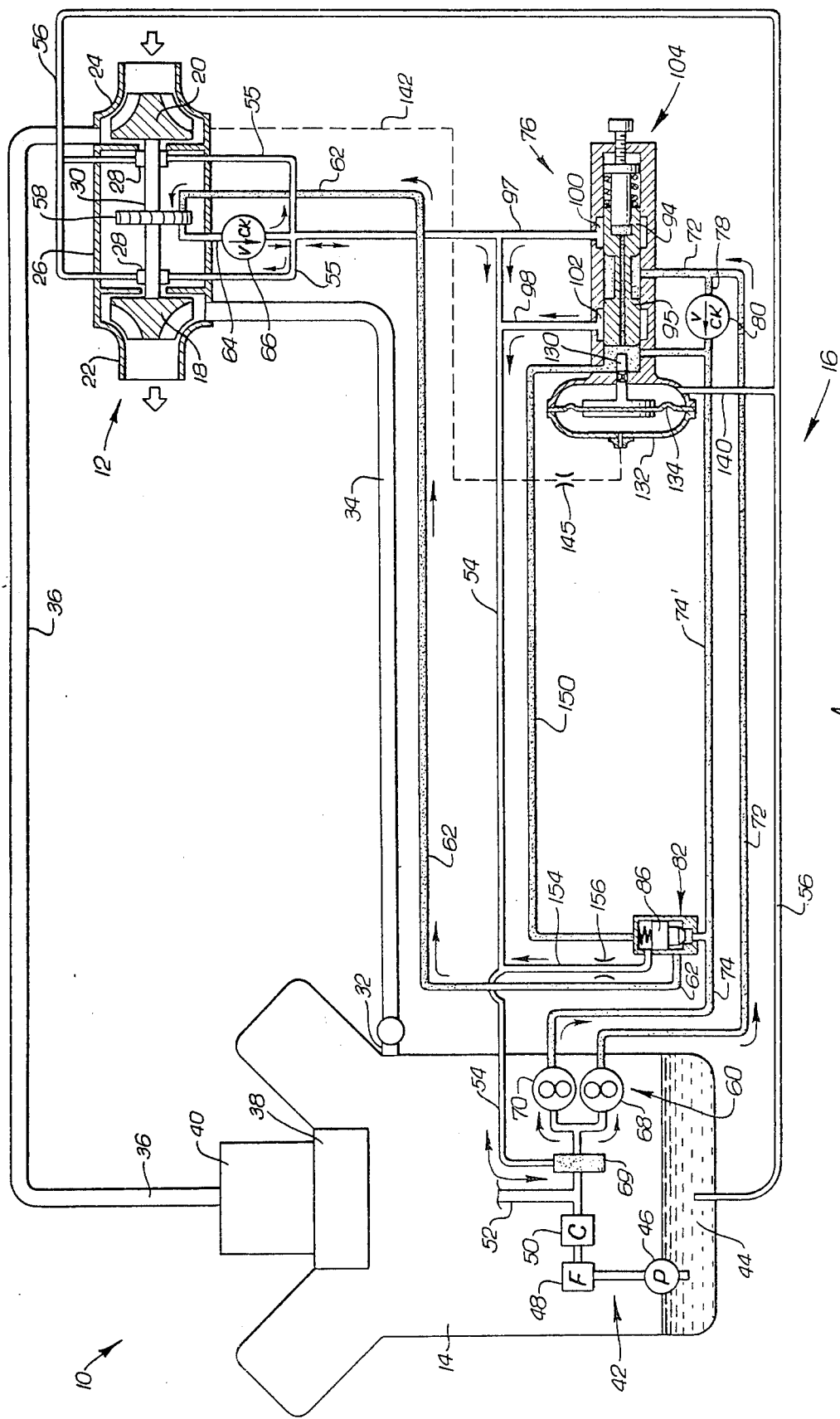
FIG. 1 is a schematic diagram illustrating an hydraulic assist turbocharger and engine system including a control arrangement embodying the novel features of the invention.

A turbocharged engine system is illustrated generally in FIG. 1 and is designated by the reference numeral 10. As shown, the engine system 10 includes an hydraulic assist turbocharger 12 for supplying relatively high density charge air to a combustion engine 14, such as a two-cycle or a four-cycle internal combustion engine. The turbocharger 12 is normally driven in a conventional manner by exhaust gases expelled from the engine. However, during selected conditions of engine operation, the turbocharger is supplementally driven by hydraulic fluid under pressure which is supplied and regulated by a control arrangement 16 of this invention.

The hydraulic assist turbocharger 12 comprises, in accordance with a preferred form of the invention, a so-called three wheel turbocharger of the type described in detail in commonly assigned U.S. Pat. No. 4,285,200. The turbocharger 12 thus includes a turbine wheel 18 and a compressor wheel 20 connected to the opposite ends of a common shaft 30 and received respectively within turbine and compressor housings 22 and 24. The turbine and compressor housings 22 and 24 are interconnected by a center housing 26 including bearings 28, such as suitable journal and thrust bearings, for rotatably supporting the shaft 30, all in a well-known manner.

The turbocharger turbine wheel 18 is rotatably driven by exhaust gases expelled from the engine 14 through an exhaust gas manifold 32 and an exhaust conduit 34. The rotating turbine wheel 18 rotatably drives the turbocharger shaft 30 and the compressor wheel 20 whereby the compressor wheel 20 draws in and compresses ambient air. This compressed ambient air comprises so-called boost or charge air and is supplied to the engine 14 via a charge air conduit 36 to an air intake manifold 38. Conveniently, as shown, a charge air cooler heat exchanger 40 of conventional design may be provided along the conduit 36 to cool the compressed charge air so as to reduce the total engine heat load and to further densify the charge air. This relatively high density charge air supplied to the engine enables the engine to operate at a relatively high performance and efficiency level.

The engine 14 conventionally includes an hydraulic pumping system 42 for providing a lubricant, such as motor oil, to the engine and to the turbocharger 12 for lubrication purposes. More specifically, the pumping system 42 normally includes a main oil sump 44 from which oil is pumped by a relatively low pressure engine-driven oil pump 46 to the engine and the turbocharger. As shown, the oil is pumped through an oil filter 48 and an oil cooler 50 and further through an appropriate network of passages as indicated by a conduit 52 to engine components requiring lubrication. The oil is also coupled through an oil supply conduit 54 to the center housing 26 of the turbocharger 12 for lubrication of the turbocharger bearings 28 via a network of appropriate passages indicated by the conduits 55 which can be partially or wholly formed within the center housing. The oil passes through the bearings 28, typically as by a gravity-drain system, and is returned to the sump 44 by an oil return conduit 56. Accordingly, the turbocharger bearings 28 share the engine hydraulic system 42 to assure proper bearing lubrication for all conditions of engine operation.

During some conditions of engine operation, the engine exhaust gases have insufficient energy for driving the turbocharger at a rotational speed necessary to provide sufficient mass flow of charge air to the engine for maintaining desired engine performance levels. Such operating conditions may include, for example, relatively low speed operation wherein the exhaust gas energy level is inadequate to permit operation at a relatively high load or with a relatively rapid acceleration. Moreover, in a two-cycle engine, the turbocharger is incapable of providing sufficient charge air during engine cranking speeds to permit starting of the engine or to properly scavenge the engine cylinders of exhaust products during low speed operation. Accordingly, to assure that the turbocharger is driven at a sufficient speed to supply the engine with a sufficient quantity of charge air at all times, the three wheel turbocharger 12 includes a nonventilated hydraulic turbine 58 for use in supplementally driving the turbocharger.

As illustrated, the nonventilated hydraulic turbine 58 is mounted within the turbocharger center housing 26 upon the turbocharger shaft 30 and axially between the sets of bearings 28. When supplemental driving of the turbocharger is required, a relatively high pressure hydraulic fluid, such as oil shared from the engine oil system 42, is provided to the center housing 26 by a high pressure pump assembly 60 forming a portion of the control arrangement 16 of this invention to be described in more detail. The pressurized fluid is coupled to the center housing through a supply conduit 62 for flow into driving communication with the hydraulic turbine 58 to supplementally drive the turbocharger and thereby increase the mass flow of charge air to the engine.

The general construction and operation of the nonventilated hydraulic turbine 58 is described in detail in the above-referenced U.S. Pat. No. 4,285,200, which is incorporated by reference herein. Importantly, the pressurized hydraulic fluid rotatably drives the hydraulic turbine 58 and the turbocharger shaft 30 at a relatively high rotational speed to result in a corresponding rotation of the compressor wheel 20 to increase the mass flow of charge air supplied to the engine. The hydraulic fluid is then discharged from the center housing 26 into a discharge conduit 64 for flow through a one-way check valve 66 into the oil supply conduit 54 and return therethrough to the intake side of the high pressure pump assembly 60. Conveniently, while the fluid flow through this oil supply conduit 54 is thus reversed throughout the duration of supplemental driving of the turbocharger, sufficient back-pressure remains in the conduit 54 to insure sufficient oil flow to the turbocharger bearings 28 and return via the oil return conduit 56. The check valve 66 functions to prevent flow of fluid from the oil supply conduit 54 into communication with the hydraulic turbine 58 when supplemental turbocharger driving is not required.

The control arrangement 16 of this invention is provided for closely controlling the supply of the hydraulic fluid to the nonventilated hydraulic turbine whenever supplemental turbocharger driving is required. More particularly, the control arrangement 16 is responsive to a combination of engine speed and engine load to provide a relatively high degree of supplemental driving of the turbocharger when engine speed and load are relatively low. However, as engine speed and/or load increases, the energy level of the engine exhaust gases correspondingly increases such that the relative need for supplemental turbocharger driving progressively decreases. In this regard, the control arrangement 16 regulates the supply of the pressurized hydraulic fluid in response to increases in engine speed and/or load to reduce the relative degree of supplemental driving of the turbocharger. Accordingly, the control arrangement constitutes an energy efficient system which provides only the degree of supplemental turbocharger driving required to maintain the desired charge air flow. Importantly, as the relative need for supplemental turbocharger driving decreases, the control arrangement 16 advantageously unloads portions of the high pressure pump assembly 60 to minimize the amount of engine power used to operate the pump assembly.

In general terms, the control arrangement 16 comprises a plurality of positive displacement pumping elements which form the high pressure pump assembly 60 and which provide individual hydraulic flow outputs for connection and supply as a combined pressurized hydraulic flow through the supply conduit 62 to the nonventilated hydraulic turbine 58. A dual function hydropneumatic control valve 76 is associated with the individual hydraulic flow outputs and operates to progressively disconnect the hydraulic flow outputs one at a time from the hydraulic turbine 58 in response to a combined function of increasing engine speed and load. The control valve 76 couples the individual flow outputs one at a time to an appropriate low pressure portion of the system such that the positive displacement pumping elements are substantially unloaded. Thus, driving energy required to operate the unloaded pumping elements is minimized, whereby the unloaded elements can be continuously driven in an energy-efficient manner with low power consumption such that their fluid outputs are substantially immediately available for subsequent supplemental driving of the turbocharger when engine speed and/or load is subsequently reduced.

In a preferred form of the invention, as illustrated in FIG. 1, the positive displacement pumping elements of the high pressure pump assembly 60 comprise a pair of positive displacement gear pumps 68 and 70 having their intakes coupled in common to a relatively small sump 69 at the discharge side of the low pressure oil pump 46. These gear pumps 68 and 70, which can be provided in any suitable number, are preferably formed as part of a single gear pump unit or assembly driven by the engine as by a suitable mechanical connection to the engine camshaft (not shown) or the like. Accordingly, the two gear pumps 68 and 70 provide separate hydraulic flow outputs each having a flow rate directly proportional to engine speed.

The separate hydraulic flow outputs of the gear pumps 68 and 70 flow through a pair of parallel flow conduits 72 and 74 which are coupled to the dual function control valve 76. When engine speed and load are relatively low, the control valve 76 permits the flow output from the gear pump 68 to flow through a branch conduit 78 and a one-way check valve 80 into a portion 74' of the flow conduit 74 whereby the flow outputs of the two gear pumps 68 and 70 are combined into a single hydraulic flow.

Figure 3:
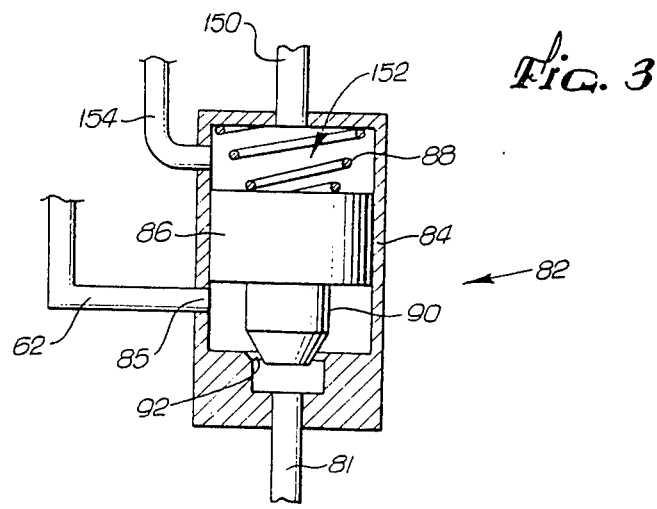
FIG. 3 is an enlarged vertical section somewhat in schematic form illustrating a shut-off valve forming a portion of the control arrangement.

The combined hydraulic flow in the conduit 74 is coupled to an inlet port 81 of a relatively low pressure hydraulic shut-off valve 82 which permits passage of the hydraulic fluid into the supply conduit 62. More particularly, as viewed in FIG. 3, the shut-off valve 82 comprises a hollow valve body 84 containing a valve piston 86 biased by a relatively lightweight spring 88 to move a valve plug 90 of relatively small cross section toward normal seated engagement upon an annular valve seat 92 to close the inlet port 81. However, the pressure of the hydraulic fluid at the valve inlet 81 causes the valve plug 90 and the piston 86 to move to the open position, as shown in FIG. 3, to permit fluid flow through the inlet port 81 into the valve body 84 and further through an outlet port 85 to the supply conduit 62. As described hereinabove, this supply conduit 62 couples the pressurized hydraulic fluid flow to the nonventilated hydraulic turbine 58 for supplemental driving of the turbocharger.

The dual function control valve 76 controls the supply of hydraulic fluid through the conduit 62 to the hydraulic turbine 58 by progressively unloading the flow outputs of the gear pumps 68 and 70 in response to increases in engine speed and/or load. The control valve 76 is, in the illustrated embodiment, responsive primarily to variations in engine speed to maintain the hydraulic pressure in the conduit 62 at a substantially constant level throughout a range of engine operating speed. In this manner, the energy input to the hydraulic turbine is substantially constant throughout this engine speed range to supplementally drive the turbocharger compressor. However, since the driving energy in the exhaust gases also increases with engine speed, the relative proportion of the total driving energy supplied by the hydraulic fluid decreases progressively with increases in engine speed. This relative decrease in supplemental turbocharger driving is consistent with a reduced need for supplemental driving at higher engine speeds.

The dual function control valve 76 is further responsive to engine load to partially or completely override the normal speed-responsive operation. More particularly, when engine load increases to a relatively high level, the available energy in the engine exhaust gases for driving the turbocharger turbine 18 correspondingly increases such that the need for supplemental turbocharger driving is reduced or eliminated. When a high load condition occurs, the control valve 76 functions to further unload the flow outputs of the gear pumps 68 and 70 to reduce the hydraulic pressure in the supply conduit 62 and thereby reduce the degree of supplemental driving of the turbocharger. If the engine load is sufficiently high and no supplemental turbocharger driving required, the control valve 76 functions to unload the pump flow outputs completely whereupon turbocharger operation continues solely in response to engine exhaust gases. When the engine load subsequently returns to a lower level, the control valve 76 progressively reconnects the pump flow outputs to the supply conduit 62 to correspondingly return to a normal speed-responsive mode.

Figure 2:
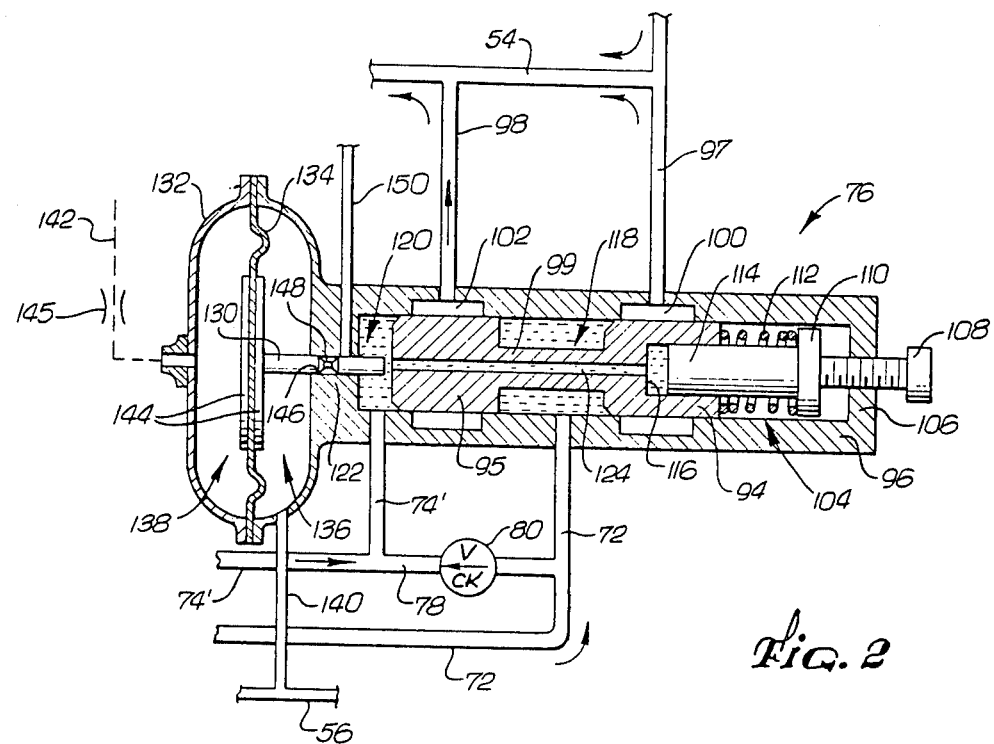
FIG. 2 is an enlarged vertical section somewhat in schematic form illustrating a hydropneumatic control valve forming a portion of the control arrangement.

As shown in detail in FIG. 2, the control valve 76 comprises a spool valve having a pair of spool lands 94 and 95 movable within an elongated hollow valve body 96 for respectively coupling the hydraulic flow outputs of the gear pumps 68 and 70 to a pair of outlet conduits 97 and 98. More specifically, the two spool lands 94 and 95 are received within the valve body 96 and are connected to each other by an interconnecting stem 99 of reduced cross-sectional size such that the spool lands are movable together in response to engine speed and load variations, as will be described. The spool lands 94 and 95 are respectively positioned generally in axial alignment with a pair of radially enlarged annular outlet chambers 100 and 102 which communicate respectively with the outlet conduits 97 and 98. The spool lands are sized to close these outlet chambers, as viewed in FIG. 2, and are positioned normally in the closed position by a spring-loaded position adjustment assembly 104 reacting between the outboard axial side of the spool land 94 and the adjacent end wall 106 of the valve body. In the embodiment shown, this adjustment assembly 104 comprises a set screw 108 threadably received through the end wall 106 to adjustably bear against a flange 110, and a compression spring 112 reacts between the flange 110 and the adjacent outboard side of the spool land 94. Conveniently a guide cylinder 114 extends from the flange 110 into an axially centered counterbore 116 in the spool 94 to maintain the components in the desired axial alignment with each other.

The flow conduit 72 is connected to the control valve 76 at a position generally intermediate the length of the valve body 96 for coupling the flow output of the gear pump 68 into an annular volume 118 defined by the axially open space surrounding the stem 99 between the two spool lands 94 and 95. Accordingly, the hydraulic pressure of this flow output acts in opposite axial directions upon the two spool lands 94 and 95 such that the lands do not displace axially in response to the hydraulic pressure within the annular volume 118.

The flow conduit portion 74' is also coupled to the control valve 76, but this conduit portion 74' is connected for admission of its associated hydraulic flow output into a pressure chamber 120 between the spool land 95 and the adjacent end wall 122 of the valve body. Accordingly, the hydraulic pressure of the fluid in the conduit portion 74' reacts between the spool land 95 and the end wall 122 to urge both spool lands 94 and 95 in an axial direction against the force of the compression spring 112. Conveniently to permit use of a relatively lightweight spring 112 and thereby obtain accurate control over movement of the spool land, a portion of the force in the chamber 120 can be offset by coupling the fluid in the pressure chamber 120 through a small central bore 124 into the counterbore 116 formed in the opposite spool 94.

In operation, the pressure of the hydraulic fluid coupled to the pressure chamber 120 acts against the outboard axial face of the spool land 95 to urge the two spool lands 94 and 95 axially against the compression spring 112. When the pressure in the pressure chamber 120 reaches a sufficient magnitude, the spool land 94 begins to uncover its associated annular outlet chamber 100 to allow a portion of the flow output supplied by the gear pump 68 to bypass the check valve 80 and flow through the annular volume 118 to the outlet chamber 100. Thus, a portion of the flow output supplied by the gear pump 68 is unloaded or disconnected from the pressure chamber 120 and further from the supply conduit 62. Importantly, the degree of fluid unloading is controlled by the compression spring 112 in a manner to maintain the fluid pressure within the pressure chamber 120 substantially constant. The unloaded portion of the flow output is discharged from the outlet chamber 100 to the associated outlet conduit 97 for supply to the relatively low pressure conduit 54.

Figure 4:
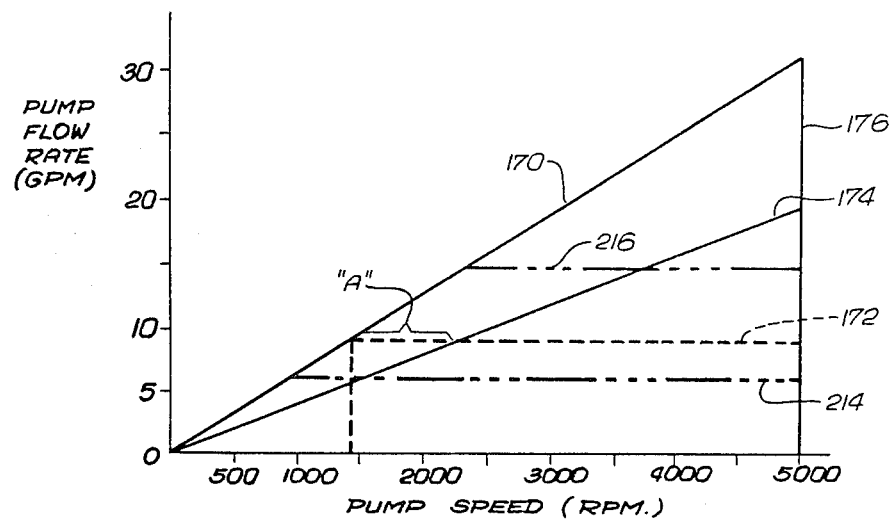
FIG. 4 is a graphic representation depicting the operation of the control arrangement of this invention.

The above-described operation of the control valve is further illustrated graphically in FIG. 4, which depicts the variation in total flow output of the gear pumps 68 and 70 as a function of engine speed. More particularly, as noted hereinabove, the two positive displacement gear pumps 68 and 70 driven by the engine provide a combined total hydraulic fluid flow output which increases progressively with increases in engine speed, as illustrated by the line 170 in FIG. 4. Upon starting of the engine, both engine speed and pump speed increase from zero with a corresponding increase in the combined pump flow output and hydraulic pressure within the conduits coupled to the hydraulic turbine. This combined hydraulic pressure is communicated to the pressure chamber 120 within the control valve 76. When the hydraulic pressure in the pressure chamber 120 reaches a predetermined selected magnitude, such as about 1000 psi at about 1400 rpm pump speed, as illustrated by the dotted line 172, the fluid pressure moves the spool lands 94 and 95 to begin unloading of the fluid output provided by the gear pump 68 to hold the pressure at a substantially constant level.

As engine and pump speed increase further, the combined flow output of the two gear pumps 68 and 70 also increase such that the control valve 76 is required to increase the portion of hydraulic fluid unloaded from the supply conduit 62. In this regard, the spool lands 94 and 95 move further against the compression spring 112 to progressively increase the unloading of the fluid output of the gear pump 68 until the pump 68 is fully unloaded, as indicated by the region "A" of the line 172 in FIG. 4. When this occurs, the other gear pump 70 is providing a sufficient hydraulic fluid flow output to maintain the pressure within the supply conduit 62 at the desired selected magnitude, as shown by the line 174 in FIG. 4, indicating the speed-responsive fluid flow rate provided by the pump 70. However, with still further increases in engine and pump speed up to an arbitrary rated speed, as denoted by the speed line 176, the spool land 95 progressively uncovers its associated annular outlet chamber 102 to progressively unload the fluid output of the pump 70 through the outlet conduit 98 to the conduit 54 to maintain the pressure in the supply conduit 62 at the substantially constant level.

When engine speed subsequently decreases, the hydraulic fluid flow rate progressively decreases to permit the spool lands 94 and 95 to move toward their original positions under the influence of the compression spring 112. As a result, the flow output of the gear pump 70 is progressively reconnected to the supply conduit 62 followed by similar progressive reconnection of the flow output of the gear pump 68 to the extent required for supplemental driving of the turbocharger.

The control valve 76 thus permits optimum supplemental driving of the turbocharger throughout a relatively low engine speed range, inclusive of starting speeds, by coupling the total combined fluid flow output of the pumps 68 and 70 to the hydraulic turbine 58 until the fluid pressure in the supply conduit 62 reaches the predetermined magnitude. When the predetermined pressure is reached, the control valve 76 functions to maintain the pressure substantially constant with further increases in engine speed by progressively unloading the pump flow outputs. Since the energy level in the engine exhaust gases increases with engine speed, this results in a relatively reduced supplemental driving of the turbocharger as engine speed increases. Importantly, the unloaded portions of the pump flow outputs are coupled to the low pressure conduit 54 such that the pumps are partially unloaded and can be continuously operated without high power consumption. The low pressure conduit 54 recycles the unloaded fluid outputs to the small sump 69 at the intake side of the pumps 68 and 70 for resupply to the pumps.

The control valve 76 further includes means for adjusting the position of the spool lands 94 and 95 as a function of engine load. More specifically, a pneumatically operated actuator rod 130 is provided for adjustably varying the position of the spool lands in response to the pressure of the charge air supplied to the engine, wherein this charge air pressure is representative of engine load.

The pneumatic adjustment means comprises, as viewed in FIG. 2, an enlarged housing 132 at the end of the valve body 96 adjacent the pressure chamber 120, wherein this housing is divided by a resilient diaphragm 134 into a pair of axially separate chambers 136 and 138. The chamber 136 is coupled to a low reference pressure, such as a connection via a conduit 140 to the sump return conduit 56, whereas the other chamber 138 is coupled to charge air pressure as by a pneumatic line 142 connected to the discharge side of the turbocharger compressor housing 24. The diaphragm 134 is thus subjected to a pressure differential indicative of engine load for movement axially toward the spool lands 94 and 95.

The actuator rod 130 is suitably connected to the diaphragm 134, as by use of retainer plates 144, and extends through a small bore 146 in the valve body end wall 122 into the pressure chamber 120. While the actuator rod 130 can be physically connected to the adjacent spool land 95, it is preferred to provide a normal spacing between the rod and land such that the control valve is capable of normal speed-responsive operation substantially independent of engine load. However, as engine load increases, the actuator rod 130 moves toward and eventually bears against the outboard side of the spool land 95 to urge the spool lands 94 and 95 toward a further unloaded position. This results in a reduction in the pressure of the hydraulic fluid supplied to the hydraulic turbine 58 and thus also reduces the relative degree of supplemental driving of the turbocharger. Of course, when engine load decreases, the pneumatic pressure in the diaphragm chamber 138 decreases to retract the actuator rod from engagement with the spool land 95 and permit continued control valve operation solely in response to engine speed. Conveniently, however, the pneumatic line 142 includes a flow restrictor 145 to isolate the diaphragm from immediate response to charge air pressure fluctuations of short duration.

When the engine load reaches a predetermined maximum level, the actuator rod 130 couples a portion of the fluid in the pressure chamber 120 to the shut-off valve 82 to insure positive closure of the shut-off valve and a cessation of supply of hydraulic fluid to the nonventilated hydraulic turbine. More specifically, the actuator rod 130 includes an annular recess 148 which ultimately moves into communication with the pressure chamber 120 when the predetermined maximum load is reached.

When this occurs, the fluid in the pressure chamber 120 is coupled to a control conduit 150 which is connected to the shut-off valve 82 into a chamber 152 (FIG. 3) at the side of the piston 86 opposite the valve plug 90. This results in balanced fluid pressures acting on the piston 86 to permit the spring 88 to positively seat the valve plug 90 on the valve seat 92, with the fluid being exhausted from the chamber 152 through a conduit 154 including a restrictor 156 to the low pressure oil supply conduit 54. Fluid supply to the hydraulic turbine 58 is thus positively prevented until the engine load decreases and the actuator rod 130 moves the recess 148 out of communication with the pressure chamber 120. During cessation of fluid supply to the hydraulic turbine, turbocharger operation continues solely in response to engine exhaust gases.

The control arrangement of this invention thus accurately controls and schedules the flow rate and pressure of hydraulic fluid to an hydraulic assist turbocharger as a combined function of engine speed and load. The control arrangement regulates the hydraulic fluid flow to provide the required level of supplemental turbocharger driving. The various pumping elements of the control arrangement advantageously continue pumping operation for all conditions of engine operation to permit rapid supply of the required hydraulic flow to the turbocharger. However, the pumping elements are substantially unloaded one by one such that the individual pumping elements consume little power during continued operation when their outputs are disconnected from the turbocharger.

The control arrangement is particularly useful either with four-cycle or two-cycle engines, such as diesel engines, to provide supplemental turbocharger driving in response to engine speed and load. In a two-cycle engine, the control arrangement is particularly advantageous in that the control valve can be scheduled for supplemental turbocharger driving in a manner to eliminate any requirement for a conventional scavenging blower. Moreover, the provision of the small sump 69 at the intake side of the pump assembly 60 permits a sufficient quantity of hydraulic fluid to be circulated to the turbocharger during starting to accelerate the turbocharger for providing sufficient charge air for starting purposes. Thus, auxiliary starting equipment is not required.

Figure 5:
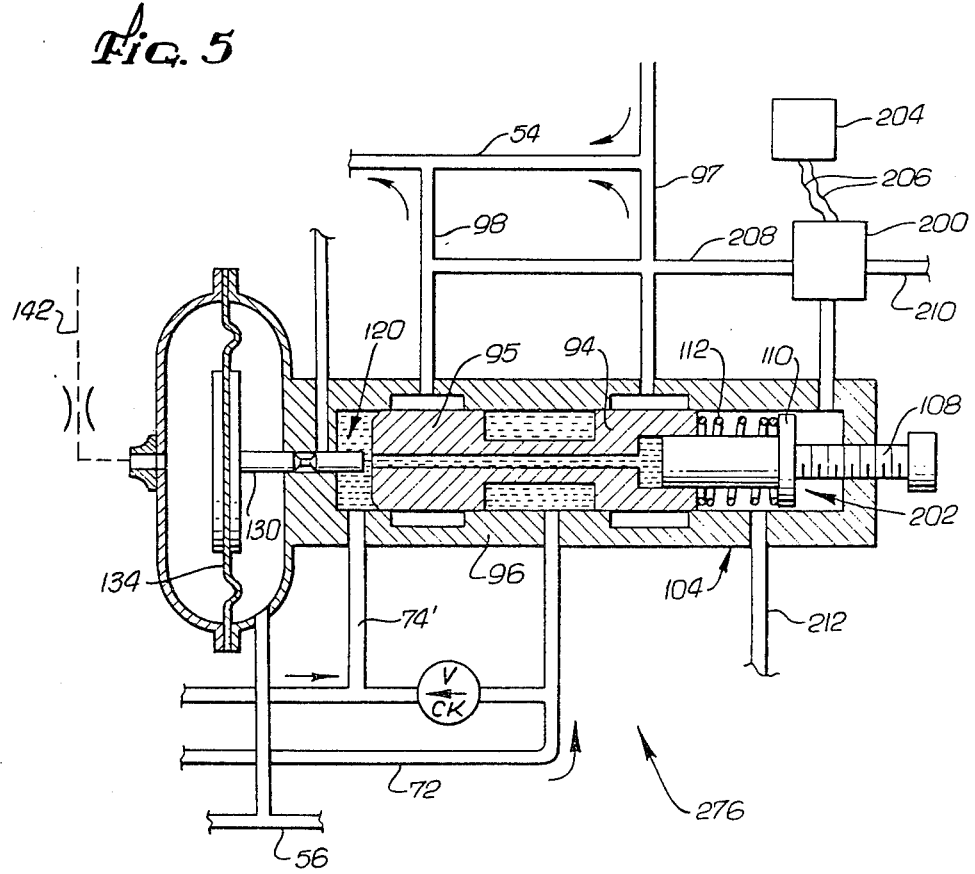
FIG. 5 is an enlarged vertical section somewhat in schematic form of a hydropneumatic control valve similar to FIG. 2 in conjunction with an alternative form of the invention.

A modified form of the hydropneumatic control valve for use in the control arrangement 16 of this invention is illustrated in FIG. 5, wherein components identical to those shown and described with respect to FIG. 2 are designated by use of common reference numerals. This modified control valve 276 includes transient response means in addition to the speed- and load-responsive components for enabling a temporary boosting of supplemental turbocharger driving during a transient operating condition, such as a heavy acceleration.

As shown in FIG. 5, the modified control valve 276 includes the valve body 96 in which is carried the spool lands 94 and 95 for speed-responsive unloading of the fluid outputs provided by the two gear pumps. In addition, the control valve 276 includes the actuator rod 130 carried by the resilient diaphragm 134 for load-responsive movement to further unload the pump fluid outputs to further reduce supplemental turbocharger driving, all as described with respect to the embodiment shown in FIG. 2. The speed- and load-responsive unloading of the fluid outputs is opposed by the position adjustment assembly 104, including the compression spring 112, reacting between the spool land 94 and a piston flange 110 with an adjustment set screw 108 bearing against the outboard side of the piston flange 110.

In the embodiment of FIG. 5, a transient response override valve 200 is provided for sensing the occurrence of a predetermined transient condition and for responding thereto to supply pressurized hydraulic fluid into the valve body 96 within a chamber 202 at the outboard side of the piston flange 110. This provides an axial force supplementing the force of the compression spring 112 and acting against the hydraulic pressure in the pressure chamber 120 to urge the spool lands 94 and 95 toward a position of decreasing unloading. As a result, the fluid pressure within the pressure chamber 120 and supplied to the hydraulic turbine 58 is increased for the duration of the transient condition to increase the level of supplemental driving of the turbocharger.

The transient response override valve 200 comprises, in a preferred form, a two-position solenoid valve assembly of conventional construction responsive to the presence of a transient condition, such as a heavy engine acceleration. This transient response can be achieved by use of conventional electronic fuel controls and scheduling devices, referred to generally by reference numeral 204, which provide an electrical signal over conductors 206 to control energization of the solenoid valve assembly 200.

During a transient condition, the solenoid valve assembly 200 is energized to open a flow path between an appropriate supply of hydraulic fluid having at least a minimum pressure level and the override chamber 202 within the valve body 96. As illustrated, the supply of hydraulic fluid can be obtained via a conduit 208 coupled to the fluid outlet conduit 98 carrying fluid from the pressure chamber 120, although other sources of hydraulic fluid are available within the turbocharger system. When the transient condition ends, the solenoid valve assembly is deenergized to close the conduit 208 and exhaust the override chamber, as by a drain conduit 210 coupled to the oil return conduit 56 or the like. Conveniently, any fluid leaking past the piston flange 110 is also drained to the oil return conduit 56 by an additional drain conduit 212.

The modified control valve 276 thus permits supply of hydraulic fluid to the hydraulic turbine 58 at a selected higher pressure level for temporary increased supplemental turbocharger driving during a heavy acceleration condition. With this additional response characteristic, the compression spring 112 can be chosen to provide a smaller spring force than is required in the embodiment of FIG. 2 to provide a slightly reduced constant pressure of hydraulic fluid over the major portion of the speed range, as depicted by the dot-dash line 214 in FIG. 4. This results in a reduced supplemental driving of the turbocharger during nontransient conditions without any adverse performance effect, since increased supplemental driving is available during the transient condition when the increased driving is required. That is, when the transient condition is sensed, the control valve 276 decreases the unloading of the fluid outputs to increase the pressure of hydraulic fluid supplied to the hydraulic turbine to a higher level, as depicted by the dot-dash line 216 in FIG. 4. Of course, when the transient condition concludes, the hydraulic pressure returns to the lower level indicated by the line 214.

A variety of modifications and improvements to the control arrangement described herein are believed to be apparent to one skilled in the art. Accordingly, no limitation on the invention is intended, except as set forth in the appended claims.

What is claimed is:

1. For use in a turbocharged engine including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
   a pump assembly including a plurality of pumping elements for providing a plurality of hydraulic flow outputs for supply to the hydraulic turbine; and
   control valve means including means for responding to engine speed and means for responding to engine load for coupling the hydraulic flow outputs to the hydraulic turbine during one condition of engine operation for maximum supplemental driving of the compressor, and for serially and progressively uncoupling the hydraulic flow outputs from the hydraulic turbine one at a time in response to changes in at least one of engine speed and load indicative of a requirement for reduced supplemental driving of the compressor.

2. The control arrangement of claim 1 wherein said plurality of pumping elements comprise a plurality of positive displacement pumping elements.

3. The control arrangement of claim 1 wherein said plurality of pumping elements comprise a plurality of engine driven gear pumps.

4. The control arrangement of claim 1 including means for combining the separate hydraulic outputs of said pumping elements for supply as a single hydraulic flow to the hydraulic turbine.

5. The control arrangement of claim 1 wherein said control valve means progressively uncouples the hydraulic flow outputs one at a time from the hydraulic turbine in response to changes in at least one of engine speed and load indicative of a requirement for reduced supplemental driving of the compressor.

6. The control arrangement of claim 1 wherein said speed-responsive means is responsive to engine speed for coupling the hydraulic flow outputs to the hydraulic turbine when engine speed is relatively low and for serially uncoupling the hydraulic flow outputs from the hydraulic turbine in response to increases in engine speed.

7. The control arrangement of claim 6 wherein said pump assembly includes a pair of pumping elements, and wherein said speed responsive means is responsive to engine speed for progressively uncoupling the hydraulic flow output of one of said pumping elements and then progressively uncoupling at least partially the hydraulic flow output of the other of said pumping elements.

8. The control arrangement of claim 1 wherein said lead-responsive means is responsive to engine load for coupling the hydraulic flow outputs to the hydraulic turbine when engine load is relatively low and for serially uncoupling the hydraulic flow outputs from the hydraulic turbine in response to increases in engine load.

9. The control arrangement of claim 1 including shut-off valve means responsive to at least one of engine speed and load for positively preventing flow of hydraulic fluid to the hydraulic turbine during a second condition of engine operation.

10. The control arrangement of claim 1 wherein said speed-responsive means and said load-responsive means are responsive to a predetermined function of engine speed and load for coupling the hydraulic flow outputs to the hydraulic turbine when said function is indicative of said one condition of engine operation and for serially uncoupling said hydraulic flow outputs from the hydraulic turbine when said function is indicative of a reduced requirement for supplemental driving of the compressor.

11. The control arrangement of claim 10 wherein said speed-responsive means and said load-responsive means serially uncouples the hydraulic flow outputs from the hydraulic turbine in response to increases in engine speed and in response to increases in engine load.

12. The control arrangement of claim 10 including means responsive to engine load for positively preventing flow of hydraulic fluid to the hydraulic turbine when engine load reaches a predetermined magnitude.

13. The control arrangement of claim 1 wherein said control valve means includes means for coupling said hydraulic flow outputs when uncoupled from the hydraulic turbine to a relatively low pressure sump for substantially unloading said associated pumping element in response to changes in at least one of engine speed and load indicative of a reduced requirement for supplemental driving of the compressor.

14. The control arrangement of claim 1 wherein said plurality of pumping elements comprises first and second engine-driven gear pumps; and wherein said control valve means comprises a spool valve having a hollow valve body with a pair of discharge outlets, a pair of spool lands carried within said valve body and connected together for simultaneous axial sliding movement, adjustable spring means for urging said spool lands to a normal position covering said discharge outlets, and means for coupling the flow output of said first gear pump into said valve body between said spool lands and for coupling the flow output of at least said second gear pump into said valve body for urging said spool lands axially against said spring means to progressively uncover one of said discharge outlets for progressively uncoupling the flow output of said first gear pump from the hydraulic turbine and then to progressively uncover the other of said discharge outlets for progressively uncoupling at least partially the flow output of said second gear pump from the hydraulic turbine.

15. The control arrangement of claim 14 including means for combining the flow outputs of said first and second gear pumps for supply as a combined flow to the hydraulic turbine, and wherein said means for coupling the flow output of at least said second gear pump to said valve body comprises means for coupling the combined flow to said valve body.

16. The control arrangement of claim 14 including an actuator rod disposed for axially bearing engagement with one of said spool lands, and means for urging said rod in an axial direction for bearing engagement with said one spool land to urge said spool lands against said spring means in response to increasing engine load.

17. The control arrangement of claim 16 wherein said urging means comprises a flexible diaphragm movably responsive to the pressure of air discharged from the compressor for moving said actuator rod axially with respect to said spool lands.

18. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
   a plurality of positive displacement pumping elements driven by the engine to provide a plurality of hydraulic output flows each having a flow rate directly proportional to engine speed; and
   control valve means for responding to the flow rates of said hydraulic flow outputs for coupling said flow outputs to the hydraulic turbine for maximum supplemental driving of the compressor when engine speed is relatively low, and for serially and progressively uncoupling said flow outputs from the hydraulic turbine upon increases in engine speed to maintain the pressure of hydraulic fluid supplied to the hydraulic turbine substantially constant throughout a range of increasing engine speed for progressively relatively reduced supplemental driving of the compressor;
   said control valve means further including transient response means for responding to the presence of a transient engine operating condition for increasing the pressure of the hydraulic fluid supplied to the hydraulic turbine for the duration of the sensed transient condition.

19. The control arrangement of claim 18 including means for combining said flow outputs into a combined hydraulic flow for supply through a supply conduit to the hydraulic turbine, said control valve means being responsive to the pressure of hydraulic fluid in said supply conduit for serially uncoupling said flow outputs.

20. The control arrangement of claim 18 wherein said control valve means further includes means for progressively reducing the pressure of the hydraulic fluid supplied to the hydraulic turbine in response to increases in engine load.

21. The control arrangement of claim 20 including shut-off valve means responsive to engine load for positively preventing flow of hydraulic fluid to the hydraulic turbine when engine load reaches a predetermined magnitude.

22. The control arrangement of claim 18 wherein said control valve means includes means for coupling the uncoupled flow outputs to a relatively low pressure sump for substantially unloading said associated pumping elements.

23. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
   a plurality of pumping elements for providing a plurality of hydraulic flow outputs for supply to the hydraulic turbine; and
   control means for responding to engine load for coupling the hydraulic flow outputs to the hydraulic turbine when engine load is relatively low for maximum supplemental driving of the compressor, and for serially and progressively uncoupling the hydraulic flow outputs from the hydraulic turbine in response to increases in engine load for reduced supplemental driving of the compressor;
   said control valve means further including transient response means for sensing the presence of a transient engine operating condition and for increasing the pressure of the hydraulic fluid supplied to the hydraulic turbine for the duration of the sensed transient condition.

24. The control arrangement of claim 23 including shut-off valve means responsive to engine load for positively preventing flow of hydraulic fluid to the hydraulic turbine when engine load reaches a predetermined magnitude.

25. The control arrangement of claim 23 wherein said control valve means includes means for coupling the uncoupled flow outputs to a relatively low pressure sump for substantially unloading said associated pumping elements.

26. The control arrangement of claim 23 wherein said pumping elements comprise a plurality of positive displacement pumping elements driven at a speed directly proportional to engine speed, said control valve means including a valve member movably responsive to the pressure of said hydraulic flow outputs for progressively uncoupling said flow outputs from the hydraulic turbine one at a time in response to increases in engine speed to maintain the pressure of the hydraulic fluid supplied to the hydraulic turbine relatively constant throughout a range of engine speeds, said control valve means further including means responsive to engine load for adjusting the position of said valve member to decrease the pressure of the hydraulic fluid supplied to the hydraulic turbine in response to increases in engine load.

27. The control arrangement of claim 26 wherein said load-responsive means includes means responsive to the pressure of air discharged from the compressor for bearing against said valve member when said air pressure is relatively high for moving said valve member toward a position further uncoupling said flow outputs from the hydraulic turbine.

28. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
   a plurality of positive displacement pumping elements driven by the engine to provide a plurality of hydraulic flow outputs each having a flow rate directly proportional to engine speed;
   means for combining said flow outputs into a combined flow for supply to the hydraulic turbine; and
   control valve means including first means responsive to the hydraulic pressure of said combined flow for serially and progressively uncoupling said flow outputs one at a time from said combined flow upon increases in engine speed to maintain the pressure of the hydraulic fluid supplied to the hydraulic turbine substantially constant throughout a range of engine speeds to reduce the relative level of supplemental driving of the compressor upon increases in engine speed, and second means responsive to the pneumatic pressure of air discharged from the compressor for adjusting the position of said first means to further serially and progressively uncouple said flow outputs one at a time from said combined flow upon increases in said pneumatic pressure to reduce further the relative level of supplemental driving of the compressor throughout a range of relatively high pneumatic pressures.

29. The control arrangement of claim 28 including shut-off valve means responsive to engine load for positively preventing flow of hydraulic fluid to the hydraulic turbine when engine load reaches a predetermined magnitude.

30. The control arrangement of claim 29 wherein said shut-off valve means comprises a valve member in association with said combined flow and movable to a position preventing supply of any portion of said combined flow to the hydraulic turbine, said valve member having a control chamber formed therein and being responsive to supply of a fluid under pressure to said control chamber for preventing supply of hydraulic fluid to the hydraulic turbine, said control valve means including means for coupling a portion of the combined flow to said control chamber when said pneumatic pressure reaches a predetermined magnitude.

31. The control arrangement of claim 28 wherein said control valve means further includes transient response means for sensing the presence of a transient engine operating condition and for adjusting the position of said first means to decrease unloading of the hydraulic flow outputs for the duration of the sensed transient condition.

32. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
a plurality of positive displacement pumping elements driven by the engine to provide a plurality of hydraulic flow outputs each having a flow rate directly proportional to engine speed;
means for combining said flow outputs into a combined flow for supply to the hydraulic turbine; and
control valve means including first means responsive to the hydraulic pressure of said combined flow for serially and progressively uncoupling said flow outputs one at a time from said combined flow upon increases in engine speed to maintain the pressure of the hydraulic fluid supplied to the hydraulic turbine substantially constant throughout a range of engine speeds to reduce the relative level of supplemental driving of the compressor upon increases in engine speed, second means responsive to the pneumatic pressure of air discharged from the compressor for adjusting the position of said first means to further serially and progressively uncouple said flow outputs one at a time from said combined flow upon increases in said pneumatic pressure to reduce further the relative level of supplemental driving of the compressor throughout a range of relatively high pneumatic pressures, and transient response means for sensing the presence of a transient engine operating condition and for adjusting the position of said first means to decrease unloading of the hydraulic flow outputs for the duration of the sensed transient condition.

33. The control arrangement of claim 32 wherein said first means comprises a valve member movable in response to the pressure of the hydraulic fluid supplied to the hydraulic turbine, said second means and said transient response means being for adjusting the position of said valve member.

34. The control arrangement of claim 32 wherein said first means comprises a valve member movable in one direction for serially and progressively uncoupling the flow outputs one at a time from the hydraulic turbine and spring means for biasing said valve member in a direction opposite said one direction, said second means including means for overriding said spring means in response to increases in engine load for moving said valve member in said one direction, and said transient response means including means for supplementing said spring means and for overriding said second means for moving said valve member in said opposite direction.

35. For use in a turbocharged engine system including an hydraulic assist turbocharger having an exhaust gas driven turbine for rotatably driving a compressor and an hydraulic turbine for supplementally driving the compressor, a control arrangement for controlling the supply of hydraulic fluid to the hydraulic turbine for rotatably driving the hydraulic turbine, comprising:
a pump assembly including a plurality of pumping elements for providing a plurality of hydraulic flow outputs for supply to the hydraulic turbine; and
control valve means for coupling the hydraulic flow outputs to the hydraulic turbine, said control valve means including first means for limiting the pressure of hydraulic fluid supplied to the hydraulic turbine to a substantially constant pressure level throughout a range of engine speeds, said first means including means for progressively unloading the hydraulic flow outputs one at a time from the hydraulic turbine in response to increases in engine speed, and second means for overriding said first means and for reducing the pressure of hydraulic fluid supplied to the hydraulic turbine in response to relatively high levels of engine load, said second means including means for adjusting the position of said first means for further unloading of the hydraulic flow outputs in response to increases in engine load.

36. The control arrangement of claim 35 further including transient response means for sensing the presence of a transient engine operating condition and for adjusting the position of said first means to decrease unloading of the hydraulic flow outputs for the duration of the sensed transient condition.

37. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:
a pump assembly including a plurality of pumping elements for providing a plurality of hydraulic flow outputs for supply to the hydraulic turbine; and
control valve means including first means for limiting the pressure of hydraulic fluid supplied to the hydraulic turbine to a substantially constant pressure level throughout a range of engine speeds, second means for overriding said first means and for reducing the pressure of hydraulic fluid supplied to the hydraulic turbine in response to increases in engine load throughout a range of engine loads, and third means for responding to the presence of a transient engine operating condition for overriding said first and second means and for increasing the pressure of the hydraulic fluid supplied to the hydraulic turbine for the duration of the sensed transient condition.

38. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:

a plurality of positive displacement pumping elements driven by the engine to provide a plurality of hydraulic output flows each having a flow rate directly proportional to engine speed; and control valve means including first means for responding to the flow rates of said hydraulic flow outputs for coupling said flow outputs to the hydraulic turbine for maximum supplemental driving of the compressor when engine speed is relatively low and for serially and progressively uncoupling said flow outputs from the hydraulic turbine upon increases in engine speed to maintain the pressure of hydraulic fluid supplied to the hydraulic turbine substantially constant throughout a range of increasing engine speed for progressively relatively reduced supplemental driving of the compressor, second means for progressively reducing the pressure of the hydraulic fluid supplied to the hydraulic turbine in response to increases in engine load, and transient response means for responding to the presence of a transient engine operating condition for increasing the pressure of the hydraulic fluid supplied to the hydraulic turbine for the duration of the sensed transient condition.

39. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:

a plurality of positive displacement pumping elements driven at a speed directly proportional to engine speed for providing a plurality of hydraulic flow outputs for supply to the hydraulic turbine; and control valve means including a valve member for movably responding to the pressure of said hydraulic flow outputs for progressively uncoupling said flow outputs from the hydraulic turbine one at a time in response to increases in engine speed to maintain the pressure of the hydraulic fluid supplied to the hydraulic turbine relatively constant throughout a range of engine speeds, said valve member being further for movably responding to engine load for coupling the hydraulic flow outputs to the hydraulic turbine when engine load is relatively low for maximum supplemental driving of the compressor, and for serially and progressively uncoupling the hydraulic flow outputs from the hydraulic turbine in response to increases in engine load for reduced supplemental driving of the compressor, said control valve means further including transient response means for sensing the presence of a transient engine operating condition and for adjusting the position of said valve member for increasing the pressure of the hydraulic fluid supplied to the hydraulic turbine for the duration of the sensed transient condition.

40. For use in a turbocharged engine system including an hydraulic assist turbocharger having an exhaust gas driven turbine for rotatably driving a compressor, and an hydraulic turbine for supplementally driving the compressor, a control arrangement for controlling the supply of hydraulic fluid to the hydraulic turbine for rotatably driving the hydraulic turbine, comprising:

a plurality of pumping elements coupling first and second engine-driven gear pumps for providing a plurality of hydraulic flow outputs for supply to the hydraulic turbine; and control valve means for responding to engine load for coupling the hydraulic flow outputs to the hydraulic turbine when engine load is relatively low for maximum supplemental driving of the compressor, and for serially and progressively uncoupling the hydraulic flow outputs from the hydraulic turbine in response to increases in engine load for reduced supplemental driving of the compressor;

said control valve means comprising a spool valve having a hollow valve body with a pair of discharge outlets, a pair of spool lands carried within said valve body and connected together for simultaneous axial sliding movement, spring means for urging said spool lands to a normal position covering said discharge outlets, means for coupling the flow output of said first gear pump into said valve body between said spool lands and for coupling the flow output of at least said second gear pump into said valve body for urging said spool lands axially against said spring means to progressively uncover one of said discharge outlets for progressively uncoupling the flow output of said first gear pump from the hydraulic turbine and then to progressively uncover the other of said discharge outlets for progressively uncoupling at least partially the flow output of said second gear pump from the hydraulic turbine, an actuator rod disposed for axially bearing engagement with one of said spool lands, and means for urging said rod in an axial direction for bearing engagement with said one spool land to urge said spool lands against said spring means in response to increasing engine load.

41. The control arrangement of claim 40 wherein said urging means comprises a flexible diaphragm movably responsive to the pressure of air discharged from the compressor for moving said actuator rod axially with respect to said spool lands.

* * * * *